(12) United States Patent
Hu et al.

(10) Patent No.: US 11,689,094 B2
(45) Date of Patent: Jun. 27, 2023

(54) INDUCTIVE FLYING CAPACITOR CONVERTERS AND CONTROL TECHNIQUES THEREFOR

(71) Applicant: Apple Inc., Cupertino, CA (US)

(72) Inventors: Zhiyuan Hu, Santa Clara, CA (US); Jingdong Chen, San Jose, CA (US); Yanhui Xie, Cupertino, CA (US); Asif Hussain, Clearwater, FL (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 17/324,307

(22) Filed: May 19, 2021

(65) Prior Publication Data

US 2022/0376616 A1    Nov. 24, 2022

(51) Int. Cl.
*H02M 3/07*        (2006.01)
*H02M 1/00*        (2006.01)
*H02M 7/483*       (2007.01)

(52) U.S. Cl.
CPC ........... *H02M 1/0095* (2021.05); *H02M 3/07* (2013.01); *H02M 7/4837* (2021.05)

(58) Field of Classification Search
CPC ..... H02M 3/07; H02M 7/4837; H02M 1/0095
See application file for complete search history.

(56) References Cited

U.S. PATENT DOCUMENTS

| | | | |
|---|---|---|---|
| 2013/0119961 A1* | 5/2013 | Okuda | H02M 7/4837 323/299 |
| 2014/0266135 A1* | 9/2014 | Zhak | H02M 3/07 323/311 |
| 2016/0329809 A1* | 11/2016 | Granato | H02M 7/4837 |

\* cited by examiner

*Primary Examiner* — Alex Torres-Rivera
(74) *Attorney, Agent, or Firm* — Fletcher Yoder PC

(57) ABSTRACT

Power converters can include a plurality of switching devices and a combination of one or more inductors and one or more flying capacitors. Both boost and buck converters may employ such topologies, and can achieve high efficiency and small size in at least some applications, including those with high conversion ratios. A control circuit can generate a first pair of complementary gate drive signals to drive a first complementary switch pairs and a second pair of complementary gate drive signals to drive a second complementary switch pair. The control circuit can vary a phase shift between the first pair of complementary gate drive signals and the second pair of complementary gate drive signals to regulate the flying capacitor voltage.

17 Claims, 10 Drawing Sheets

INDUCTIVE FLYING CAPACITOR CONVERTERS AND CONTROL TECHNIQUES THEREFOR

BACKGROUND

Flying capacitor circuits may be used in various switched-capacitor power converter topologies. A basic form of a flying capacitor circuit is shown in FIG. 1. Four switches S1-S4 are connected in series or in what is sometimes called a ladder configuration. In the illustrated arrangement switches S1-S4 are MOSFETs, but other switching device types may be employed depending on the application. The flying capacitor, Cf, has one terminal connected to the drain node of switch S2 (i.e., the junction of switches S1 and S2) and its other terminal connected to the drain node of S4 (i.e., the junction of switches S3 and S4). Switches S1 and S4 are operated as a complementary switch pair, and switches S2 and S3 are operated as a complementary switch pair. Thus, when switch S1 is on, switch S4 is off and vice versa; and when switch S2 is on, switch S4 is off, and vice versa. A slight dead time may be provided between the turn off of one switch of a complementary pair and the turn on of the other switch of the complementary pair to prevent cross-conduction.

When S2/S4 are on, and S1/S3 are off, Cf is in parallel with C1 (i.e., the input of the flying capacitor circuit). When S2/S4 are off, and S1/S3 are on, Cf is in series with C1, and C2 is connected in parallel with Cf and C1 in series. As a result, the voltage of flying capacitor Cf voltage is nominally the same as C1, because the two capacitor are periodically coupled in parallel. Likewise, the voltage appearing across output capacitor C2 voltage is the C1/input voltage, because C2 is periodically coupled in parallel with the series combination of C1 and Cf. Depending on the particular application, power/energy can flow either from C1 to C2, in which case the flying capacitor works as a voltage doubler (a type of boosting converter in which the output voltage is greater than the input voltage), or from C2 to C1, in which case the flying capacitor works as a 2:1 voltage divider (a type of bucking converter in which the output voltage is less than the input voltage.

There are two limitations with the basic flying capacitor circuit and operation described above. First, output voltage cannot be regulated, but can only be twice (or half) of the input voltage. Second, flying capacitor Cf must have large capacitance value to achieve high efficiency. To address these limitations, an inductor can be added into the flying capacitor circuit, shown in FIG. 2 and referred as "inductor/flying capacitor" or "inductive flying capacitor" arrangement herein. The inductor can serve at least two functions: (1) providing output voltage regulation ability (in either direction of operation); and (2) reducing or eliminating energy losses caused by coupling two capacitors of different voltages in parallel. In the circuit topology shown in FIG. 2, when energy flows from terminal A to terminal B, the resulting converter may be referred to as a flying capacitor boost converter. When energy flows from terminal B to terminal A, the converter may be referred to as a flying capacitor buck converter, sometimes also called a three-level buck converter. In either case, the output voltage may be regulated by varying the duty cycle of the inductor's switch node.

One potential issue with such converters is that the flying capacitor voltage can "run away," instead of staying at value that is nominally half of the C2 voltage because the charge that is input into or output from flying capacitor Cf is determined by the inductor current and the charge/discharge time. Variations in inductor current and duty cycle (used to regulate output voltage) can cause an imbalance between input and output charge to the flying capacitor Cf, which if allowed to persist can drive the flying capacitor voltage to either the C2 voltage rail or ground. This can impede successful operation of such circuits in practical applications.

SUMMARY

Thus, what is needed in the art is an improved control technique for providing suitable output voltage regulation of an inductor/flying capacitor converter while also providing for suitable regulation of the flying capacitor voltage.

An inductive flying capacitor power converter can include first, second, third, and fourth series-connected switches forming a switch ladder. The first and fourth switches may be operated as a first complementary switch pair, and the second and third switches may be operated as a second complementary switch pair. The converter can further include an inductor having a first inductor terminal coupled to a converter terminal and a second inductor terminal coupled to a junction between the second and third switches. The converter may still further include a flying capacitor having a first flying capacitor terminal coupled to a junction of the first and second switches, a second flying capacitor terminal coupled to a junction of the third and fourth switching devices, and a flying capacitor voltage between the first and second flying capacitor terminals. A control circuit can generate a first pair of complementary gate drive signals to drive one of the first or second complementary switch pairs and a second pair of complementary gate drive signals to drive the other of the first or second complementary switch pair. The control circuit can vary a phase shift between the first pair of complementary gate drive signals and the second pair of complementary gate drive signals to regulate the flying capacitor voltage.

The power converter may be a boost converter, wherein the first inductor terminal may be coupled to an input terminal of the converter and an output terminal of the power converter may be coupled to the first switch. The power converter may be a buck converter, wherein the first inductor terminal may be coupled to an output terminal of the converter and an input terminal of the power converter may be coupled to the first switch.

The control circuit can further include a voltage control loop that regulates an output voltage of the converter and a flying capacitor voltage control loop that regulates the flying capacitor voltage. The voltage control loop can include a zero order hold circuit that keeps a PWM duty cycle constant during a switching period of the converter. The flying capacitor voltage control loop can include a flying capacitor voltage sensing block that generates an output signal corresponding to an average of the flying capacitor voltage during a switching period. The flying capacitor voltage control loop can include a flying capacitor voltage sensing block that generates an output signal corresponding to an average of the flying capacitor voltage during a switching period.

An inductive flying capacitor boost converter can include first, second, third, and fourth series-connected switches forming a switch ladder; an inductor having a first inductor terminal coupled to a converter input terminal and a second inductor terminal coupled to a junction between the second and third switches, wherein an output terminal of the inductive flying capacitor boost converter is coupled to the first switch; and a flying capacitor having a first flying capacitor terminal coupled to a junction of the first and second switches, a second flying capacitor terminal coupled to a junction of the third and fourth switching devices, and a flying capacitor voltage between the first and second flying capacitor terminals. The converter can further include a control circuit that generates a first pair of complementary gate drive signals to drive the first and fourth switches and a second pair of complementary gate drive signals to drive the second and third switches, wherein the control circuit varies a phase shift between of the second pair of complementary gate drive signals relative to the first pair of complementary gate drive signals to regulate the flying capacitor voltage.

The control circuit can further include a voltage control loop that regulates an output voltage of the converter and a flying capacitor voltage control loop that regulates the flying capacitor voltage. The voltage control loop can include a zero order hold circuit that keeps a PWM duty cycle constant during a switching period of the converter. The flying capacitor voltage control loop can include a flying capacitor voltage sensing block that generates an output signal corresponding to an average of the flying capacitor voltage during a switching period.

A control circuit for an inductive flying capacitor power converter having four switching devices forming a switch ladder with the first and fourth switches being operated as a complementary switch pair and the second and third switches being operated as a complementary switch pair, an inductor coupled to a junction between second and third of the four switching devices, and a flying capacitor coupled between a junction of the first and second switching devices and a junction of the third and fourth switching devices can include an output voltage control loop that regulates an output voltage of the converter; and a flying capacitor voltage control loop that regulates a flying capacitor voltage. The output voltage control loop and the flying capacitor voltage control loop can cooperate to generate a first pair of complementary gate drive signals to drive one of the complementary switch pairs and a second pair of complementary gate drive signals to drive the other complementary switch pair. The control circuit can vary a phase shift between the first pair of complementary gate drive signals and the second pair of complementary gate drive signals to regulate the flying capacitor voltage. The voltage control loop can include a zero order hold circuit that keeps a PWM duty cycle constant during a switching period of the converter. The flying capacitor voltage control loop can include a flying capacitor voltage sensing block that generates an output signal corresponding to an average of the flying capacitor voltage during a switching period.

The phase shift between the first pair of complementary gate drive signals and the second pair of complementary gate drive signals can shift the timing of a charging window of the flying capacitor, thereby changing the average current of the charging window. Shifting the timing of a charging window can cause an output charge from the flying capacitor to exceed an input charge to the flying capacitor, thereby decreasing the flying capacitor voltage. Shifting the timing of a charging window can cause an input charge to the flying capacitor to exceed an output charge from the flying capacitor, thereby increasing the flying capacitor voltage.

DETAILED DESCRIPTION

Figure 1:
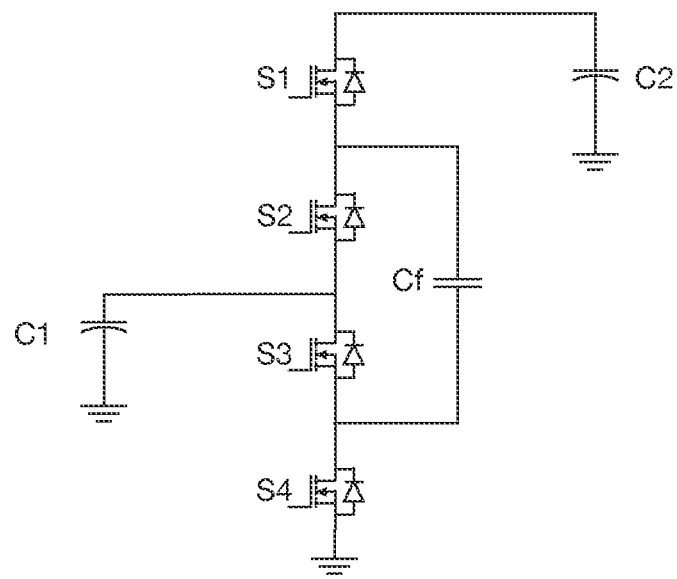
FIG. 1 illustrates an exemplary flying capacitor arrangement.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 2:
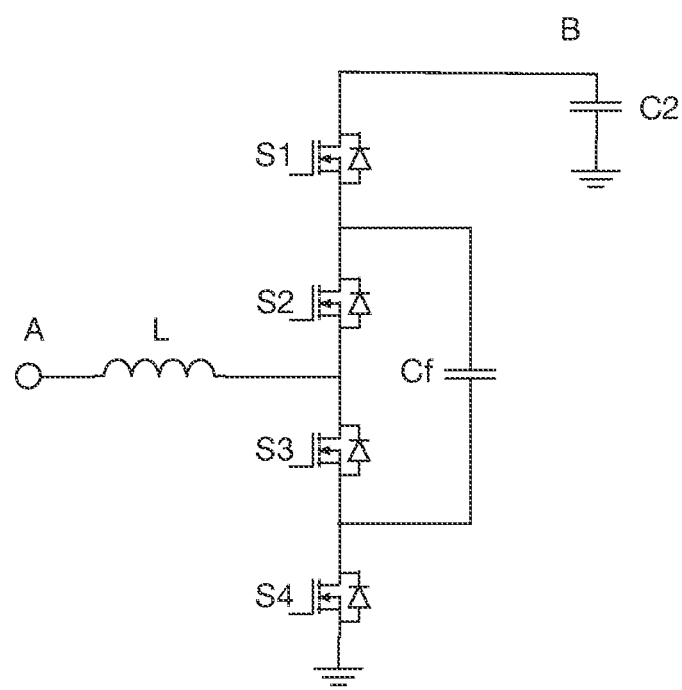
FIG. 2 illustrates an exemplary inductive flying capacitor arrangement.
Figure 3:
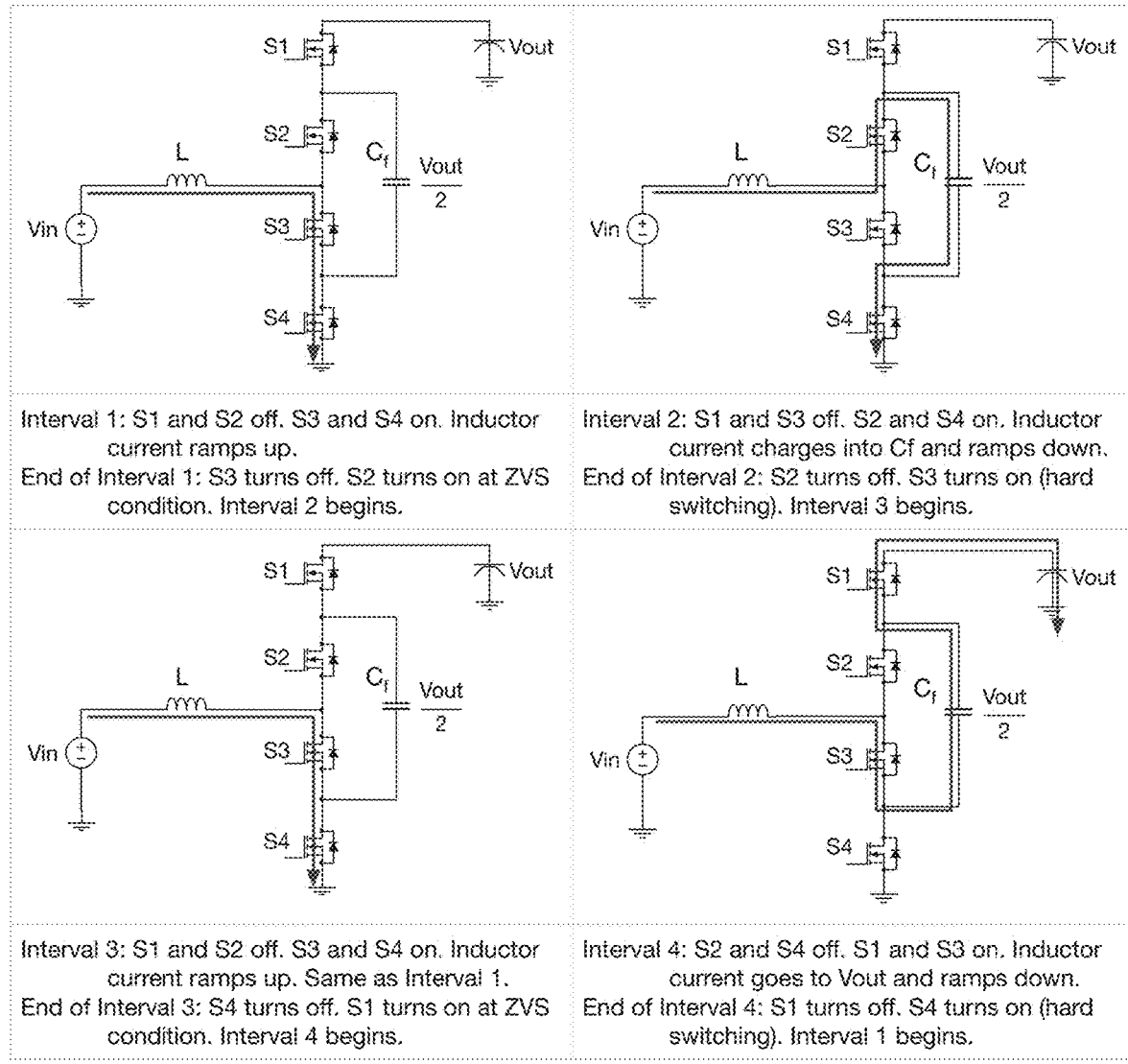
FIG. 3 illustrates an exemplary switching sequence for an inductive flying capacitor boost converter in which the output voltage is more than twice the input voltage.
Figure 4:
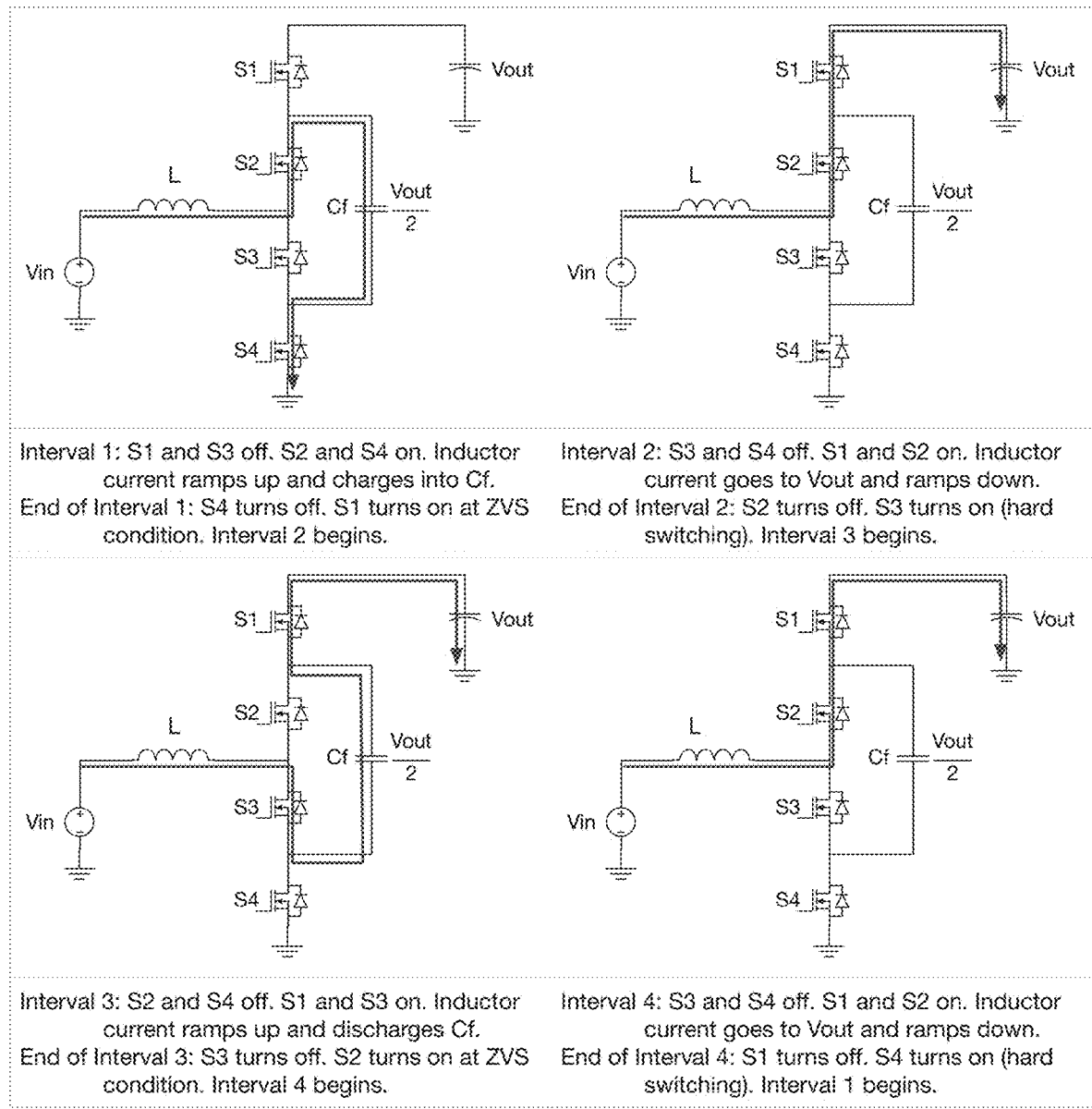
FIG. 4 illustrates an exemplary switching sequence for an inductive flying capacitor boost converter in which the output voltage is less than twice the input voltage.
Figure 5:
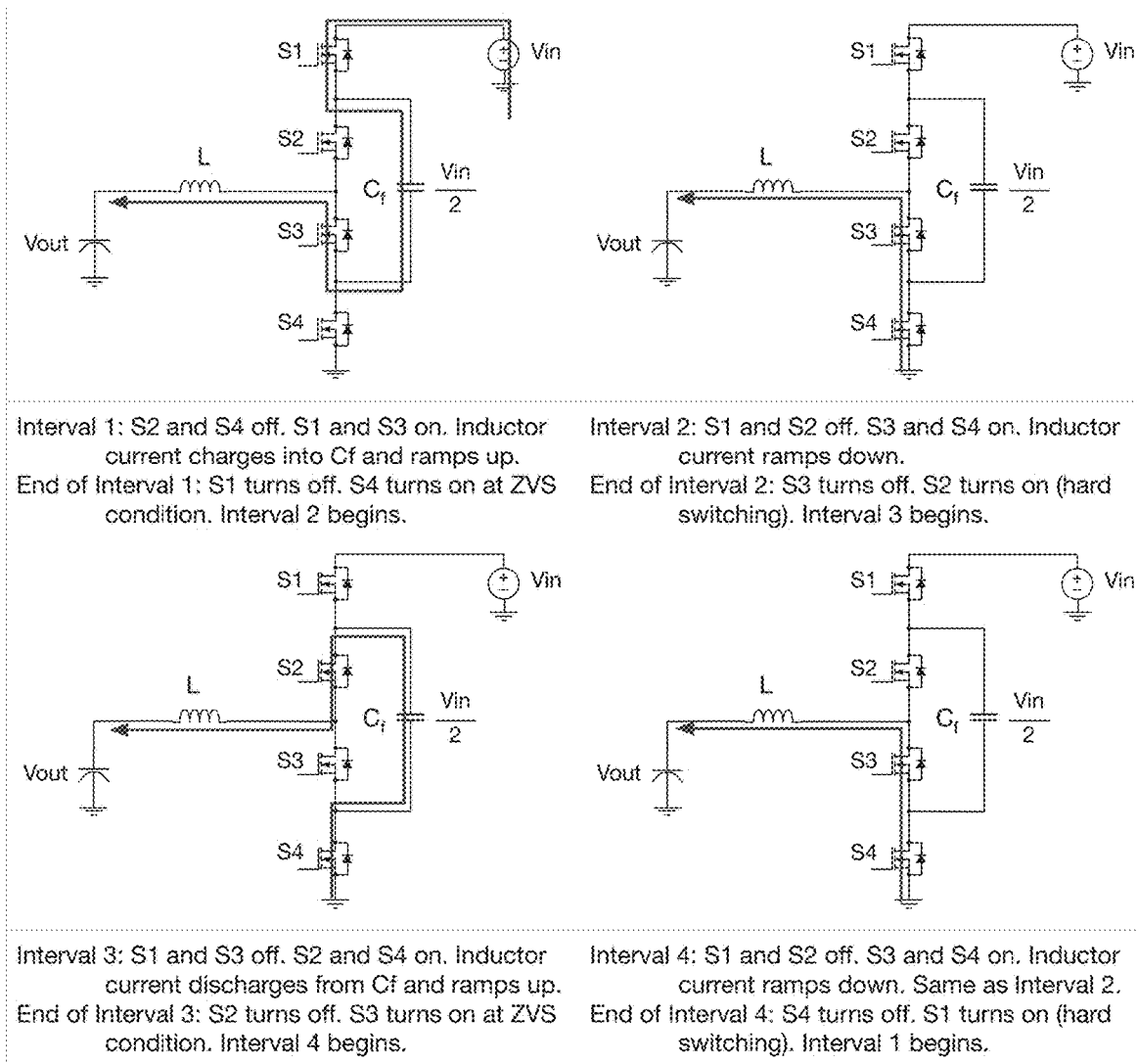
FIG. 5 illustrates an exemplary switching sequence for an inductive flying capacitor buck converter in which the input voltage is greater than twice the output voltage.
Figure 6:
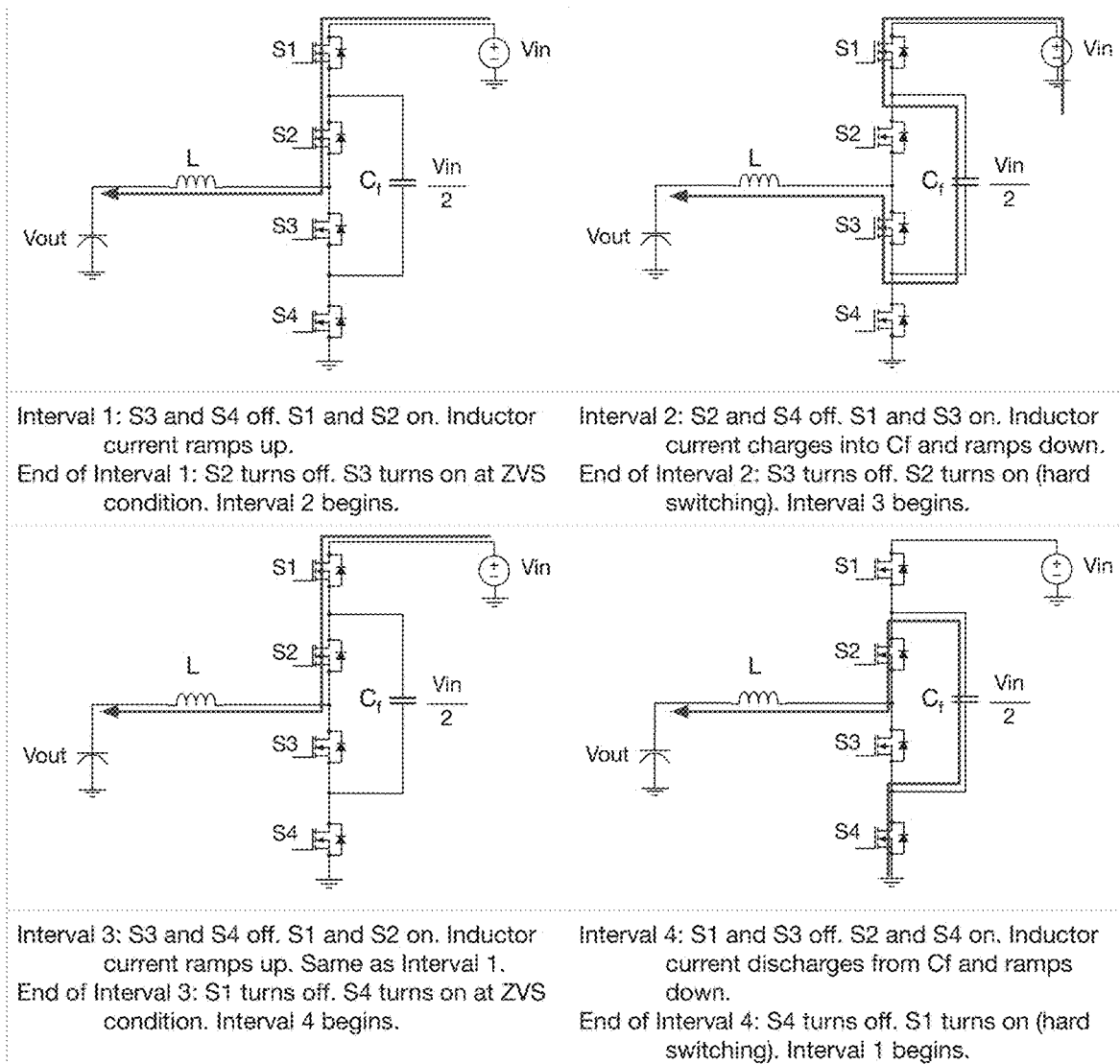
FIG. 6 illustrates an exemplary switching sequence for an inductive flying capacitor buck converter in which the input voltage is less than twice the output voltage.

Each of the inductor/flying capacitor boost and buck converters discussed above with reference to FIG. 2 has two operating modes. The operating mode depends on whether the flying capacitor voltage is higher or lower than the inductor DC node voltage, which is in turn determined by the input and output voltage amplitudes. More specifically, FIG. 3 depicts switching intervals associated with a first mode of operation of a flying capacitor boost converter in which the output voltage is greater than twice the input voltage. FIG. 4 depicts switching intervals associated with a second mode of operation of a flying capacitor boost converter in which the output voltage is less than twice the input voltage. FIG. 5 depicts a first mode of operation of a flying capacitor buck converter in which the output voltage is less than half the input voltage. FIG. 6 depicts a second mode of operation of a flying capacitor buck converter in which the output voltage is greater than half the input voltage. As will be described in greater detail below, for each converter, the first and second modes may correspond to different operating conditions of a single controller/control technique or algorithm, and do not require separate control techniques for the differing operating regions.

With reference to FIG. 3, four switching Intervals 1-4 of a flying capacitor boost converter in which the output voltage is greater than twice the input voltage are illustrated. As described above, switches S1 and S4 are operated as a complementary switch pair, such that when switch S1 is on, switch S4 is off and vice versa. Likewise, switches S2 and S3 are operated as a complementary switch pair, such that when switch S2 is on, switch S4 is off and vice versa. During Interval 1, switches S1 and S2 are off, meaning that switches S3 and S4 are on. This results in the second terminal of inductor L being coupled to ground, causing a ramp up of the current flowing through the inductor. Interval 1 may end at a time determined by the controller, as described in greater detail below. At such time, switch S3 may turn off. After a slight delay to prevent cross-conduction, switch S2 may turn on. Additionally, because the current through inductor L cannot change instantaneously upon switch S3 turning off, the inductor current will continue flowing to ground through the intrinsic body diode of switch S2, allowing switch S2 to turn on in a zero voltage switching (ZVS) condition.

During Interval 2, switches S1 and S3 are turned off, and switches S2 and S4 are turned on. As a result, the inductor current charges the flying capacitor Cf. In other words, energy stored in the inductor L is transferred to the flying capacitor Cf. As a result, the inductor current ramps down. At a time determined by the controller, switch S2 may turn off and switch S3 may turn on, beginning Interval 3. (The turn on of switch S3 may be a hard, i.e., non-ZVS switching event.).

In Interval 3, switches S1 and S2 are turned off, and switches S3 and S4 are turned on. This switch configuration corresponds to Interval 1, and the inductor current again ramps up. At a time determined by the controller, switch S4 may turn off, and, after a suitable delay to prevent cross-conduction, switch S1 may turn on, beginning Interval 4. As before, because the current through inductor L cannot change instantaneously upon switch S4 turning off, the inductor current will continue flowing through the intrinsic body diode of switch S1, allowing switch S1 to turn on in a zero voltage switching (ZVS) condition.

In Interval 4, switches S2 and S4 are turned off, and switches S1 and S3 are turned on. During Interval 4, both the inductor L and the flying capacitor Cf are discharging the energy stored therein to the output, as illustrated by the current flow path in the lower right block of FIG. 3. This results in a ramp-down/decrease of the current flowing through inductor L. At a time determined by the controller, switch S1 turns off, and switch S4 turns on (which may be a hard switching event), restarting Interval 1.

With reference to FIG. 4, four switching Intervals 1-4 of a flying capacitor boost converter in which the output voltage is less than twice the input voltage are illustrated. As described above, switches S1 and S4 are operated as a complementary switch pair, such that when switch S1 is on, switch S4 is off and vice versa. Likewise, switches S2 and S3 are operated as a complementary switch pair, such that when switch S2 is on, switch S4 is off and vice versa. During Interval 1, switches S1 and S3 are off, meaning that switches S2 and S4 are on. This results in the current flow path illustrated in the upper left quadrant of FIG. 4, in which both the inductor L and the flying capacitor Cf are charging from the input. Interval 1 may end at a time determined by the controller, as described in greater detail below. At such time, switch S4 may turn off After a slight delay to prevent cross-conduction, switch S1 may turn on, beginning Interval 2. Additionally, because the current through inductor L cannot change instantaneously upon switch S4 turning off, the inductor current will continue flowing through the intrinsic body diode of switch S1, allowing switch S1 to turn on in a zero voltage switching (ZVS) condition.

During Interval 2, switches S1 and S2 are turned on, and switches S3 and S4 are turned off. As a result, the inductor discharges energy stored therein to the output. As a result, the inductor current ramps down. At a time determined by the controller, switch S2 may turn off and switch S3 may turn on, beginning Interval 3. (The turn on of switch S3 may be a hard, i.e., non-ZVS switching event.).

In Interval 3, switches S1 and S3 are turned on, and switches S2 and S4 are turned off. This switch configuration is the opposite of Interval 1, and results in the current path illustrated in the lower left quadrant of FIG. 4. This configuration causes the inductor current to again ramp up (charging the inductor), while the illustrated current flow through flying capacitor Cf discharges the flying capacitor. At a time determined by the controller, switch S4 may turn off, and, after a suitable delay to prevent cross-conduction, switch S3 may turn off, beginning Interval 4. As before, because the current through inductor L cannot change instantaneously upon switch S3 turning off, the inductor current will continue flowing through the intrinsic body diode of switch S2, allowing switch S2 to turn on in a zero voltage switching (ZVS) condition.

In Interval 4, switches S1 and S2 are turned on, and switches S3 and S4 are turned off. During Interval 4, inductor L but not flying capacitor Cf is discharging the energy stored therein to the output, as illustrated by the current flow path in the lower right quadrant of FIG. 4. This switching configuration corresponds to Interval 2. This results in a ramp-down/decrease of the current flowing through inductor L. At a time determined by the controller, switch S1 turns off, and switch S4 turns on (which may be a hard switching event), restarting Interval 1.

With reference to FIG. 5, four switching Intervals 1-4 of a flying capacitor buck converter in which the output voltage is less than half the input voltage are illustrated. (Note that the input and output are reversed as compared to the boost converter configurations discussed above with respect to FIGS. 3 and 4.) As described above, switches S1 and S4 are operated as a complementary switch pair, such that when switch S1 is on, switch S4 is off and vice versa. Likewise, switches S2 and S3 are operated as a complementary switch pair, such that when switch S2 is on, switch S4 is off and vice versa. During Interval 1, switches S1 and S3 are on, meaning that switches S2 and S4 are off. This results in the current flow path illustrated in the upper left quadrant of FIG. 5, in which both the inductor L and the flying capacitor Cf are charging from the input. Interval 1 may end at a time determined by the controller, as described in greater detail below. At such time, switch S1 may turn off. After a slight delay to prevent cross-conduction, switch S4 may turn on, beginning Interval 2. Additionally, because the current through inductor L cannot change instantaneously upon switch S1 turning off, the inductor current will continue flowing through the intrinsic body diode of switch S4, allowing switch S4 to turn on in a zero voltage switching (ZVS) condition.

During Interval 2, switches S1 and S2 are turned off, and switches S3 and S4 are turned on. As a result, the inductor discharges energy stored therein to the output, causing the inductor current to ramp down. At a time determined by the controller, switch S3 may turn off and switch S2 may turn on, beginning Interval 3. (The turn on of switch S2 may be a hard, i.e., non-ZVS switching event.).

In Interval 3, switches S1 and S3 are turned off, and switches S2 and S4 are turned on. This switch configuration is the opposite of Interval 1, and results in the current path illustrated in the lower left quadrant of FIG. 5. This configuration causes the inductor current to again ramp up (charging the inductor), while the illustrated current flow through flying capacitor Cf discharges the flying capacitor. At a time determined by the controller, switch S2 may turn off, and, after a suitable delay to prevent cross-conduction, switch S3 may turn on, beginning Interval 4. As before, because the current through inductor L cannot change instantaneously upon switch S2 turning off, the inductor current will continue flowing through the intrinsic body diode of switch S3, allowing switch S3 to turn on in a zero voltage switching (ZVS) condition.

In Interval 4, switches S1 and S2 are turned off, and switches S3 and S4 are turned on. During Interval 4, inductor L but not flying capacitor Cf is discharging the energy stored therein to the output, as illustrated by the current flow path in the lower right quadrant of FIG. 5. This switching configuration corresponds to Interval 2. This results in a ramp-down/decrease of the current flowing through inductor L. At a time determined by the controller, switch S4 turns off, and switch S1 turns on (which may be a hard switching event), restarting Interval 1.

With reference to FIG. 6, four switching Intervals 1-4 of a flying capacitor buck converter in which the output voltage is greater than half the input voltage are illustrated. (Note that the input and output are reversed as compared to the boost converter configurations discussed above with respect to FIGS. 3 and 4.) As described above, switches S1 and S4 are operated as a complementary switch pair, such that when switch S1 is on, switch S4 is off and vice versa. Likewise, switches S2 and S3 are operated as a complementary switch pair, such that when switch S2 is on, switch S4 is off and vice versa. During Interval 1, switches S1 and S2 are on, meaning that switches S3 and S4 are off. This results in the current flow path illustrated in the upper left quadrant of FIG. 6, in which the inductor L is charging from the input. Interval 1 may end at a time determined by the controller, as described in greater detail below. At such time, switch S2 may turn off. After a slight delay to prevent cross-conduction, switch S3 may turn on, beginning Interval 2. Additionally, because the current through inductor L cannot change instantaneously upon switch S2 turning off, the inductor current will continue flowing through the intrinsic body diode of switch S3, allowing switch S3 to turn on in a zero voltage switching (ZVS) condition.

During Interval 2, switches S1 and S3 are turned on, and switches S3 and S4 are turned off. As a result, the inductor discharges energy stored therein to the output, causing the inductor current to ramp down. Meanwhile, the flying capacitor Cf is being charged from the input voltage Vin. At a time determined by the controller, switch S3 may turn off and switch S2 may turn on, beginning Interval 3. (The turn on of switch S2 may be a hard, i.e., non-ZVS switching event.).

In Interval 3, switches S1 and S2 are turned on, and switches S3 and S4 are turned off. This switch configuration corresponds Interval 1, and results in the current path illustrated in the lower left quadrant of FIG. 6. This configuration causes the inductor current to again ramp up (charging the inductor). At a time determined by the controller, switch S1 may turn off, and, after a suitable delay to prevent cross-conduction, switch S4 may turn on, beginning Interval 4. As before, because the current through inductor L cannot change instantaneously upon switch S1 turning off, the inductor current will continue flowing through the intrinsic body diode of switch S4, allowing switch S4 to turn on in a zero voltage switching (ZVS) condition.

In Interval 4, switches S1 and S3 are turned off, and switches S2 and S4 are turned on. During Interval 4, both inductor L and flying capacitor Cf are discharging the energy stored therein to the output, as illustrated by the current flow path in the lower right quadrant of FIG. 6. This results in a ramp-down/decrease of the current flowing through inductor L. At a time determined by the controller, switch S4 turns off, and switch S1 turns on (which may be a hard switching event), restarting Interval 1.

From the above description with reference to FIGS. 3-6, it can be appreciated that flying capacitor boost converters (FIGS. 3 and 4) and flying capacitor buck converters (FIGS. 5 and 6) converters each have two modes operation depending on the input and output voltage magnitudes. However, as will be explained in greater detail below, the two modes can share a common control scheme, in which the only difference is the duty cycle applied to the respective switch pairs, and, more specifically, whether such duty cycle is greater than or less than 50%. Referring to FIG. 2, (and also FIG. 11, discussed below), the gate drive signals for switches S1 and S4 may be complementary pulse width modulated (PWM) signals, driven by the same PWM module. Likewise, the gate drive signals for switches S2 and S3 may be complementary PWM signals, driven by the same PWM module. The S1/S4 PWM module outputs are phase shifted by 180° (i.e., half a switching period) from the S2/S3 PWM module outputs. Both PWMs can receive the same duty cycle, D, which may be generated by a feedback control loop (as discussed in greater detail below).

For a flying capacitor boost converter (as shown in FIGS. 3 and 4) converter, switches S3 and S4 may be the control FETs used to achieve output voltage regulation. Similarly, switches S1 and S2 may be synchronous rectifier FETs. (Although discussed in terms of FETs, it will be appreciated that any suitable switching device type may be employed as appropriate for a given application.). For a flying capacitor boost converter (as shown in FIGS. 5 and 6), switches S1 and S2 may be control FETs used to achieve output voltage regulation. Similarly, switches S3 and S4 may be synchronous rectifier FETs. (Again, such circuits are not limited to FETs, and may employ any suitable switching device.) For both flying capacitor boost converters and flying capacitor buck converters, a gate drive signal having a duty cycle D is applied to the control switches, and a gate drive signals having duty cycle 1-D are applied to the synchronous rectifier switches.

Figure 7:
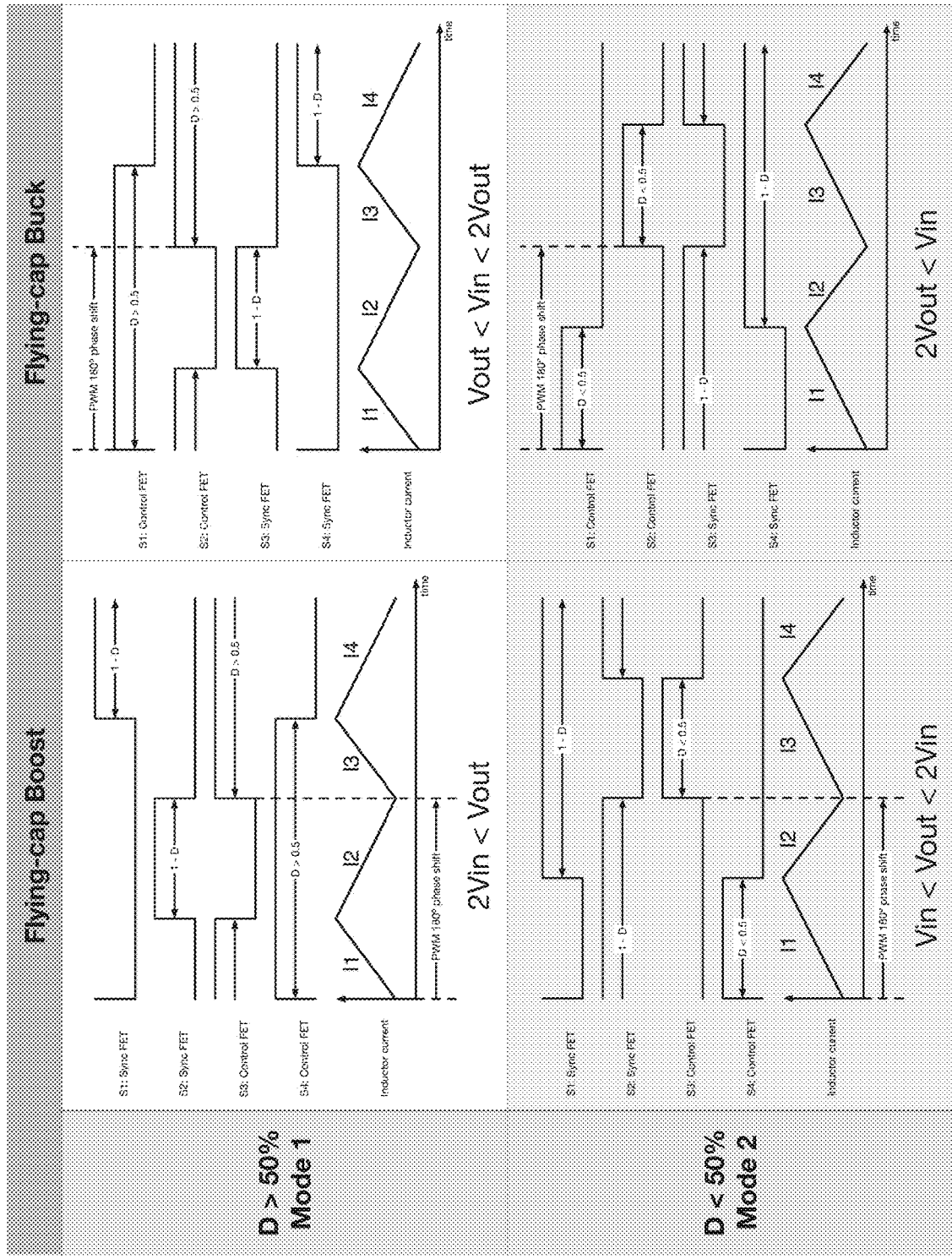
FIG. 7 illustrates switching of a unified control scheme to achieve the switching sequences described above.

Exemplary PWM time sequences of flying capacitor boost and flying capacitor buck converters are illustrated in FIG. 7. It can be seen that, as duty cycle D changes from <50% to >50%, the operation modes described above naturally transition from one to the other. For example, the upper left quadrant of FIG. 7 illustrates operation of a flying capacitor boost converter in which the input voltage is less than half the output voltage, while the lower left quadrant of FIG. 7 illustrates operation of a flying capacitor boost converter in which the input voltage is greater than half the output voltage.

With reference to the upper left quadrant of FIG. 7, gate drive signals S1 and S2 are applied to the correspondingly labeled synchronous rectifier switches S1 and S2, and these signals have a duty cycle 1-D. Below this, gate drive signals S3 and S4 are applied to the correspondingly labeled control switches S3 and S4, and these signals have a duty cycle D. Because the input voltage is less than half the output voltage, the duty cycle D of the control switches is greater than 0.5 (i.e., D>0.5). In other words, the control switches are turned on for more than half of the switching period. Consequently, the duty cycle 1-D of the synchronous rectifier switches must be less than 0.5 (i.e., (1-D)<0.5). In other words, the synchronous rectifier switches are turned on for less than half of the switching period. The relative timing of these switching operations results in the four intervals described above with reference to FIG. 3. These intervals may be most clearly seen by reference to the interval labels I1-I4 applied to the corresponding ramp-up (Intervals I1 and I3) and ramp-down (Intervals I2 and I4) of the illustrated inductor current in the upper left quadrant of FIG. 7.

Similarly, in the lower left quadrant of FIG. 7, gate drive signals S1 and S2 are applied to the correspondingly labeled synchronous rectifier switches S1 and S2, and these signals have a duty cycle 1-D. Below this, gate drive signals S3 and S4 are applied to the correspondingly labeled control switches S3 and S4, and these signals have a duty cycle D. Because the input voltage is greater than half the output voltage, the duty cycle D of the control switches is less than 0.5 (i.e., D<0.5). In other words, the control switches are turned on for less than half of the switching period. Consequently, the duty cycle 1-D of the synchronous rectifier switches must be greater than 0.5 (i.e., (1-D)>0.5). In other words, the synchronous rectifier switches are turned on for more than half of the switching period. The relative timing of these switching operations results in the four intervals described above with reference to FIG. 4. These intervals may be most clearly seen by reference to the interval labels I1-I4 applied to the corresponding ramp-up (Intervals I1 and I3) and ramp-down (Intervals I2 and I4) of the illustrated inductor current in the lower left quadrant of FIG. 7.

In short, as the input voltage varies between less than half the output voltage and more than half the output voltage, the gate drive signals applied to the control switches correspondingly transition between a duty cycle greater than 0.5 and less than 0.5. This transition alters the interaction of the respective control switches and synchronous rectifier switches to provide the two different control modes, even though the PWM signals may be generated by a single controller, as described in greater detail below.

Similarly, the upper right quadrant of FIG. 7 illustrates operation of a flying capacitor buck converter in which the input voltage is less than twice the output voltage, while the lower right quadrant of FIG. 7 illustrates operation of a flying capacitor buck converter in which the input voltage is greater than twice the output voltage.

With reference to the upper right quadrant of FIG. 7, gate drive signals S1 and S2 are applied to the correspondingly labeled control switches S1 and S2, and these signals have a duty cycle D. Below this, gate drive signals S3 and S4 are applied to the correspondingly labeled synchronous rectifier switches S3 and S4, and these signals have a duty cycle 1-D. Because the input voltage is less than twice the output voltage, the duty cycle D of the control switches is greater than 0.5 (i.e., D>0.5). In other words, the control switches are turned on for more than half of the switching period. Consequently, the duty cycle 1-D of the synchronous rectifier switches must be less than 0.5 (i.e., (1-D)<0.5). In other words, the synchronous rectifier switches are turned on for less than half of the switching period. The relative timing of these switching operations results in the four intervals described above with reference to FIG. 6. These intervals may be most clearly seen by reference to the interval labels I1-I4 applied to the corresponding ramp-up (Intervals I1 and I3) and ramp-down (Intervals I2 and I4) of the illustrated inductor current in the upper right quadrant of FIG. 7.

Similarly, in the lower right quadrant of FIG. 7, gate drive signals S1 and S2 are applied to the correspondingly labeled control switches S1 and S2, and these signals have a duty cycle D. Below this, gate drive signals S3 and S4 are applied to the correspondingly labeled synchronous rectifier switches S3 and S4, and these signals have a duty cycle 1-D. Because the input voltage is greater than half the output voltage, the duty cycle D of the control switches is less than 0.5 (i.e., D<0.5). In other words, the control switches are turned on for less than half of the switching period. Consequently, the duty cycle 1-D of the synchronous rectifier switches must be greater than 0.5 (i.e., (1-D)>0.5). In other words, the synchronous rectifier switches are turned on for more than half of the switching period. The relative timing of these switching operations results in the four intervals described above with reference to FIG. 5. These intervals may be most clearly seen by reference to the interval labels I1-I4 applied to the corresponding ramp-up (Intervals I1 and I3) and ramp-down (Intervals I2 and I4) of the illustrated inductor current in the lower left quadrant of FIG. 7.

In short, as the input voltage varies between less than twice the output voltage and more than twice the output voltage, the gate drive signals applied to the control switches correspondingly transition between a duty cycle greater than 0.5 and less than 0.5. This transition alters the interaction of the respective control switches and synchronous rectifier switches to provide the two different control modes, even though the PWM signals may be generated by a single controller, as described in greater detail below.

Figure 8:
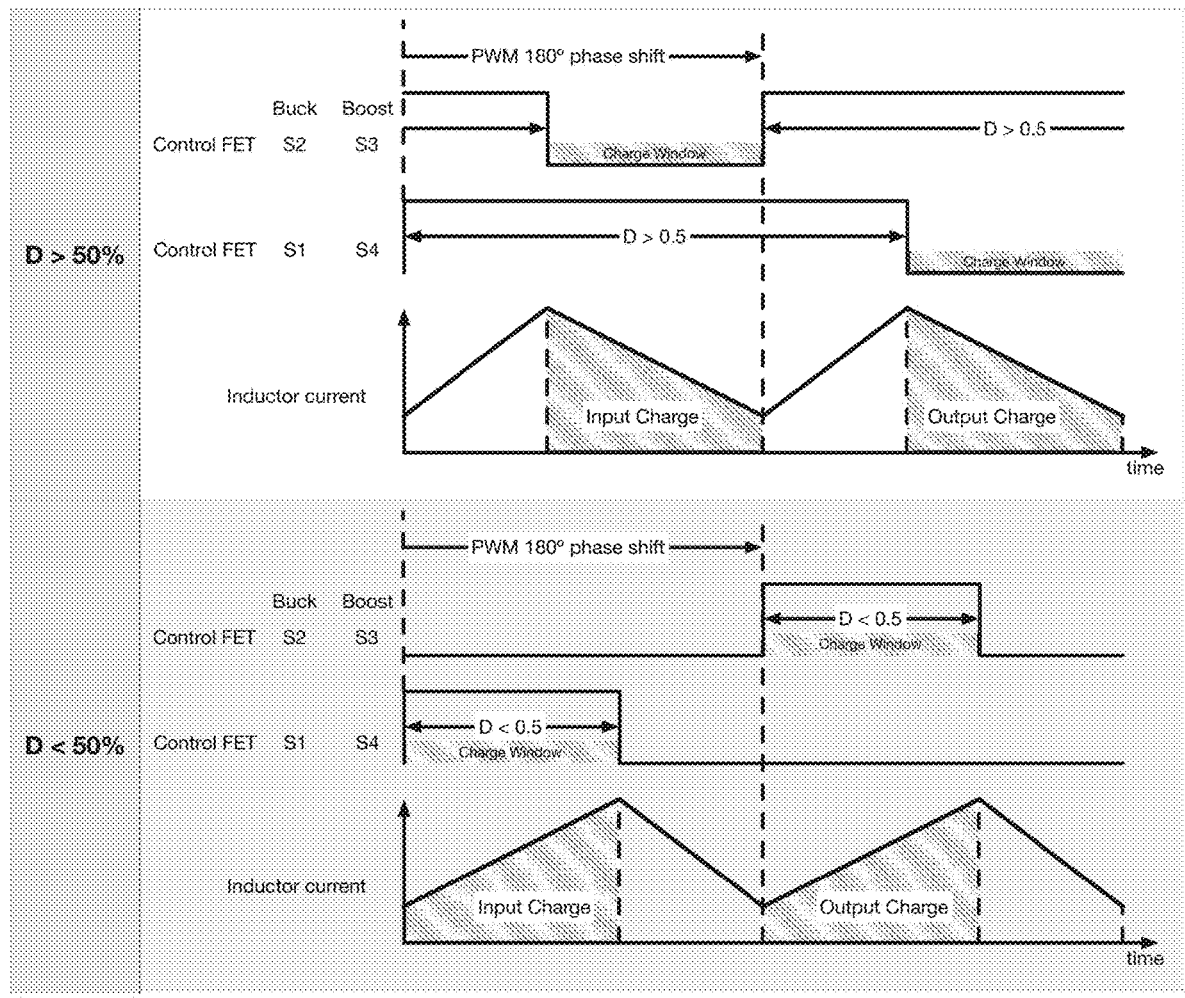
FIG. 8 illustrates steady state operation of a sliding charge window controller that achieves the switching sequences described above.

For all of the above-described converter types and operating regions, there is, in each switching period (i.e., in each sequence of intervals), one interval in which charge flows into the flying capacitor, and one interval in which charge flows out of the flying capacitor. If the amount of charge flowing into the capacitor and the amount of charge flowing out of the flying capacitor are unequal, the flying capacitor voltage will drift or "run away." This may be undesirable for converter operation. Thus, controlling the flying capacitor voltage may be achieved by controlling the amount of charge input to and output from the flying capacitor. As illustrated in FIG. 8, which may be considered as a simplified version of FIG. 7, charge transfer to and from the flying capacitor occurs when one of the two control switches is on, and the other one is off. These time intervals may be considered as a "charge window." Likewise, when both control switches are on, or when both controls witches are off, electric charge neither flows into nor out of the flying capacitor.

As shown in FIG. 8, the first charge window (left half) corresponds to putting charge into the flying capacitor (increasing its voltage), and the second charge window (right half) corresponds to pulling charge from the flying capacitor (decreasing its voltage). The area under the inductor current curve thus corresponds to the amount of Input Charge put into the flying capacitor or Output Charge pulled from the flying capacitor. If these respective areas under the inductor current curve are equal, then the flying capacitor voltage will be substantially constant (with some fluctuation or ripple due to the charging/discharging operation). Conversely, if the area under the Input Charge portion of the inductor current curve is greater than the area under the Output Charge portion of the inductor current curve, then the flying capacitor voltage will be increasing. Likewise, if the area under the Input Charge portion of the inductor current curve is less than the area under the Output Charge portion of the inductor current curve, then the flying capacitor voltage will be decreasing. Each case is discussed in greater detail below with respect to FIGS. 9 and 11.

Thus, control of the flying capacitor voltage may be achieved by introduction a "sliding charge window" concept. The sliding charge window preserves the time duration of the input and output charge windows, and only "slides" the charge window to an earlier or later time. As the location of the charge window location moves on the time axis, the average current inside the charge window changes accordingly, and thus the net input charge to the flying capacitor can be controlled. Sliding the charge window can be achieved by phase shifting the two PWM signals for the respective switch pairs. As described in the examples above, the default phase shift between the two PWM signals for the respective switch pairs is 180°. A flying capacitor voltage control loop can be configured to add an offset (which can be either positive or negative) to the 180° phase shift. This offset has the effect of shifting the time of occurrence of the charge windows in the switching period, allowing for the different average charging currents described above. Either of the two PWM signals can be used as reference, and the other PWM signal can dynamically adjust its phase shift relative to the reference PWM. The charge window time length are thus inherently preserved. Exemplary phase shifting arrangements are illustrated in FIGS. 9 and 10.

Figure 9:
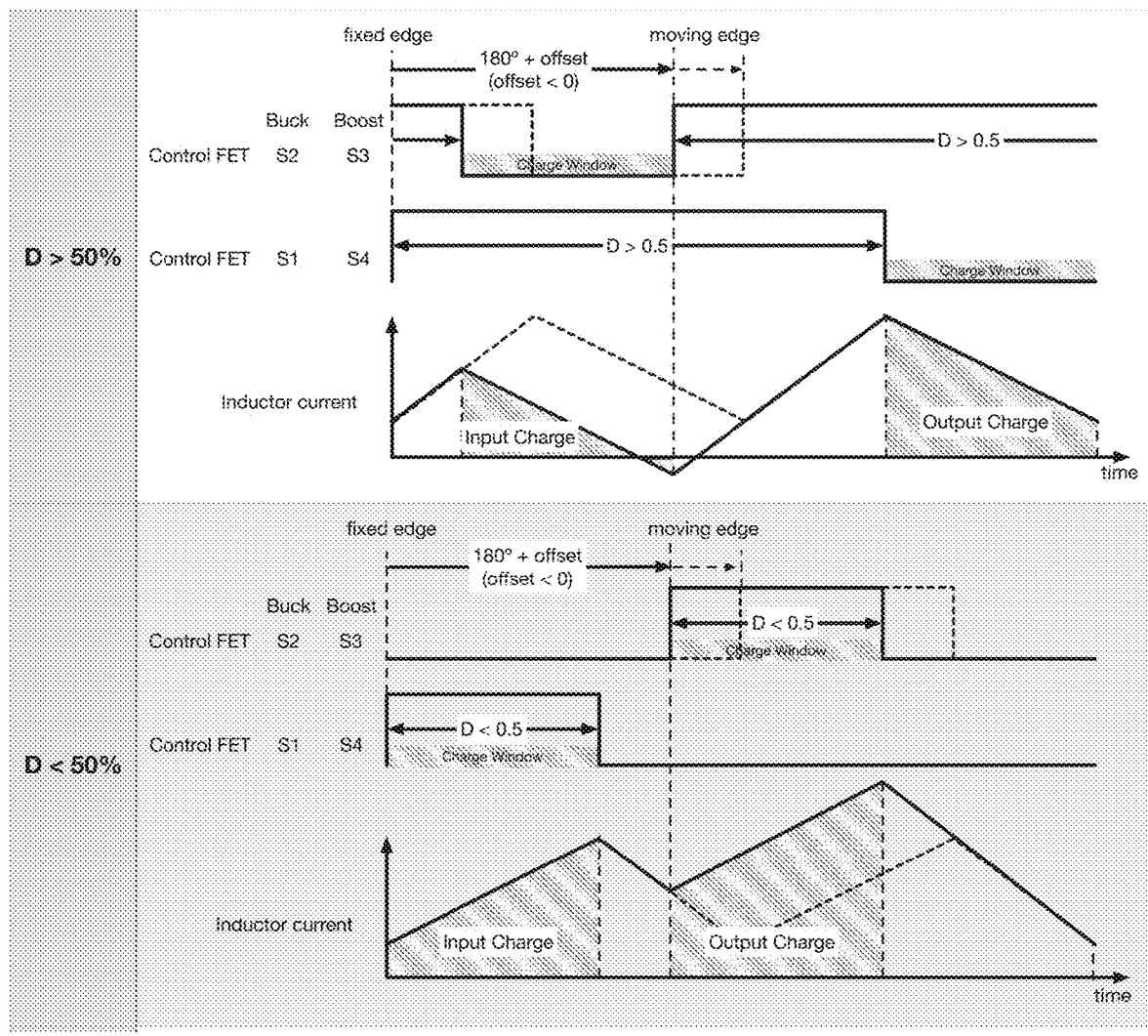
FIG. 9 illustrates operation of the sliding charge window controller operating to decrease flying capacitor voltage by phase shifting operation of the S2/S3 switch pair relative to the S1/S4 switch pair.

FIG. 9 illustrates operation of the sliding charge window controller operating to decrease flying capacitor voltage by phase shifting operation of the S2/S3 switch pair relative to the S1/S4 switch pair. By comparing FIG. 9 to FIG. 8, in the upper half of the figures (corresponding to a duty cycle greater than 0.5), it can be seen that the gate drive signals applied to S2/S3 are advanced relative to the S1/S4 gate drive signals such that the S2/S3 transitions occur earlier in time. This has the effect of advancing the input charging window of the flying capacitor, resulting in a lower average current being delivered to the capacitor. This, in turn, results in less input charge being delivered, as evidenced by the reduced area under the curve for the Input Charge window. Conversely, the output charge window remains the same as in FIG. 8, as can be seen by the constant area of the Output Charge delivered during the output charge window. As a result, the input charge delivered to the flying capacitor during the shifted input charge window is less than the output charge pulled from the flying capacitor during the unshifted output charge window, resulting in a decrease in the flying capacitor voltage. It will be appreciated that in the greater than 0.5 duty cycle region, retarding or delaying the S2/S3 gate drive signals relative to the S1/S4 gate drive signals (i.e., the reverse of what is shown) would have the opposite effect. Namely, the Input Charge delivered during the input charge window would be greater than the output charge removed during the output charge window, resulting in an increase of the flying capacitor voltage.

In the lower half of the FIGS. 8 and 9 (corresponding to a duty cycle less than 0.5), it can be seen that the gate drive signals applied to S2/S3 are advanced relative to the S1/S4 gate drive signals such that the S2/S3 transitions occur earlier in time. This has the effect of advancing the output charging window of the flying capacitor, resulting in a higher average current being pulled from the capacitor. This, in turn, results in more output charge being removed, as evidenced by the increased area under the curve for the Output Charge window. Conversely, the input charge window remains the same as in FIG. 8, as can be seen by the constant area of the Input Charge delivered during the input charge window. As a result, the input charge delivered to the flying capacitor during the shifted input charge window is less than the output charge pulled from the flying capacitor during the unshifted output charge window, resulting in a decrease in the flying capacitor voltage. It will be appreciated that in the less than 0.5 duty cycle region, retarding or delaying the S2/S3 gate drive signals relative to the S1/S4 gate drive signals (i.e., the reverse of what is shown) would have the opposite effect. Namely, the Output Charge pulled from the flying capacitor during the output charge window would be less than the input charge introduced during the input charge window, resulting in an increase of the flying capacitor voltage.

Figure 10:
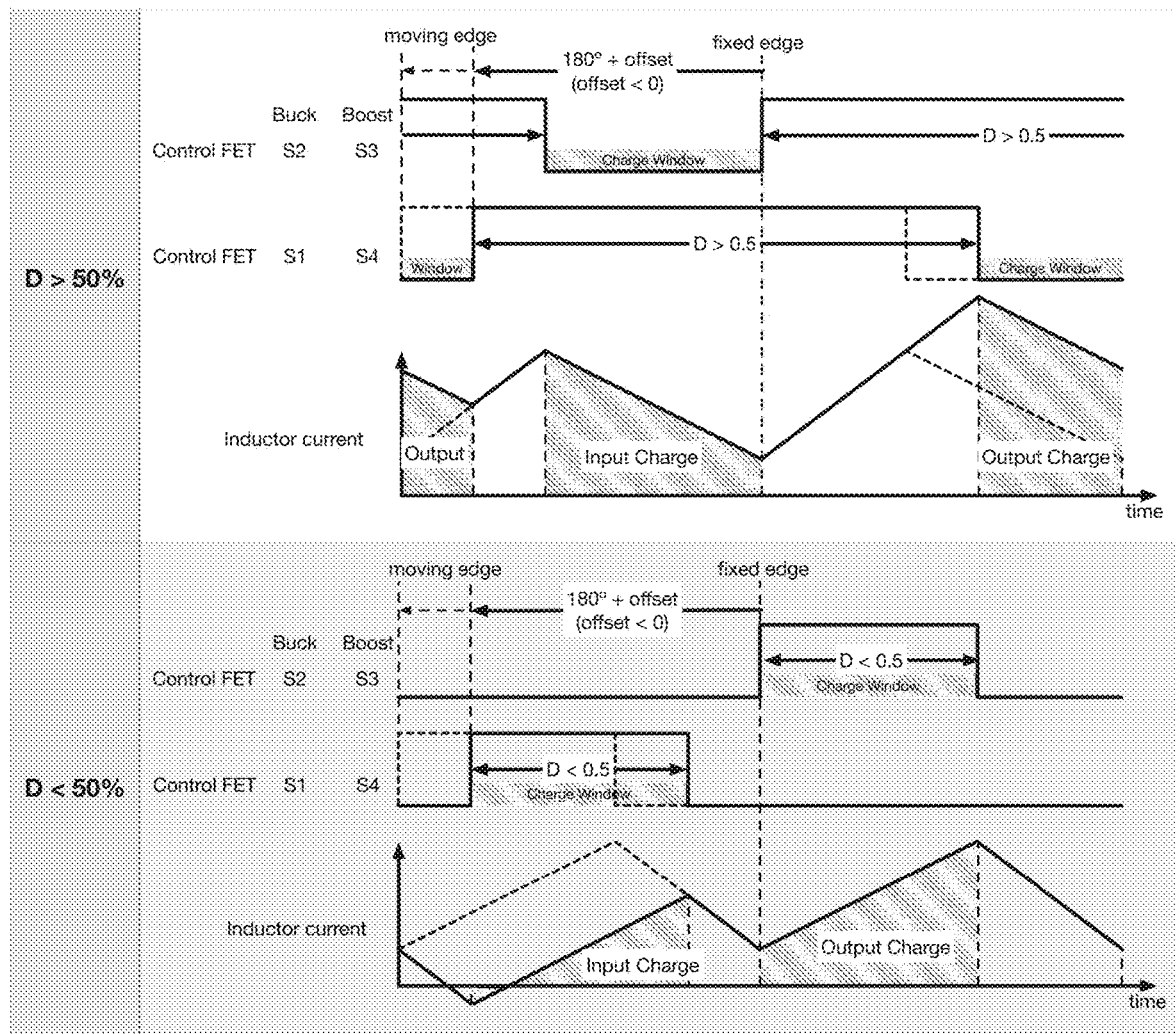
FIG. 10 illustrates operation of a sliding charge window controller operating to decrease flying capacitor voltage by phase shifting operation of the S1/S4 switch pair relative to the S2/S3 switch pair.

FIG. 10 illustrates operation of the sliding charge window controller operating to decrease flying capacitor voltage by phase shifting operation of the S1/S4 switch pair relative to the S2/S3 switch pair. By comparing FIG. 10 to FIG. 8, in the upper half of the figures (corresponding to a duty cycle greater than 0.5), it can be seen that the gate drive signals applied to S1/S4 are delayed or retarded relative to the S2/S3 gate drive signals such that the S1/S4 transitions occur later in time. This has the effect of delaying the output charging window of the flying capacitor, resulting in a higher average current being pulled from the capacitor. This, in turn, results in more output charge being removed, as evidenced by the increased area under the curve for the Output Charge window. Conversely, the input charge window remains the same as in FIG. 8, as can be seen by the constant area of the Input Charge delivered during the input charge window. As a result, the output charge pulled from the flying capacitor during the shifted output charge window is greater than the input charge delivered to the flying capacitor during the unshifted input charge window, resulting in a decrease in the flying capacitor voltage. It will be appreciated that in the greater than 0.5 duty cycle region, advancing the S1/S4 gate drive signals relative to the S2/S3 gate drive signals (i.e., the reverse of what is shown) would have the opposite effect. Namely, the Input Charge delivered during the input charge window would be greater than the output charge removed during the output charge window, resulting in an increase of the flying capacitor voltage.

In the lower half of the FIGS. 8 and 10 (corresponding to a duty cycle less than 0.5), it can be seen that the gate drive signals applied to S1/S4 are delayed/retarded relative to the S2/S3 gate drive signals such that the S1/S4 transitions occur later in time. This has the effect of delaying/retarding the input charging window of the flying capacitor, resulting in a lower average current being delivered to the capacitor. This, in turn, results in less input charge being delivered, as evidenced by the decreased area under the curve for the Input Charge window. Conversely, the output charge window remains the same as in FIG. 8, as can be seen by the constant area of the Output Charge removed during the output charge window. As a result, the input charge delivered to the flying capacitor during the shifted input charge window is less than the output charge pulled from the flying capacitor during the unshifted output charge window, resulting in a decrease in the flying capacitor voltage. It will be appreciated that in the less than 0.5 duty cycle region, advancing the S1/S4 gate drive signals relative to the S2/S3 gate drive signals (i.e., the reverse of what is shown) would have the opposite effect. Namely, the Output Charge pulled from the flying capacitor during the output charge window would be less than the input charge introduced during the input charge window, resulting in an increase of the flying capacitor voltage.

Figure 11:
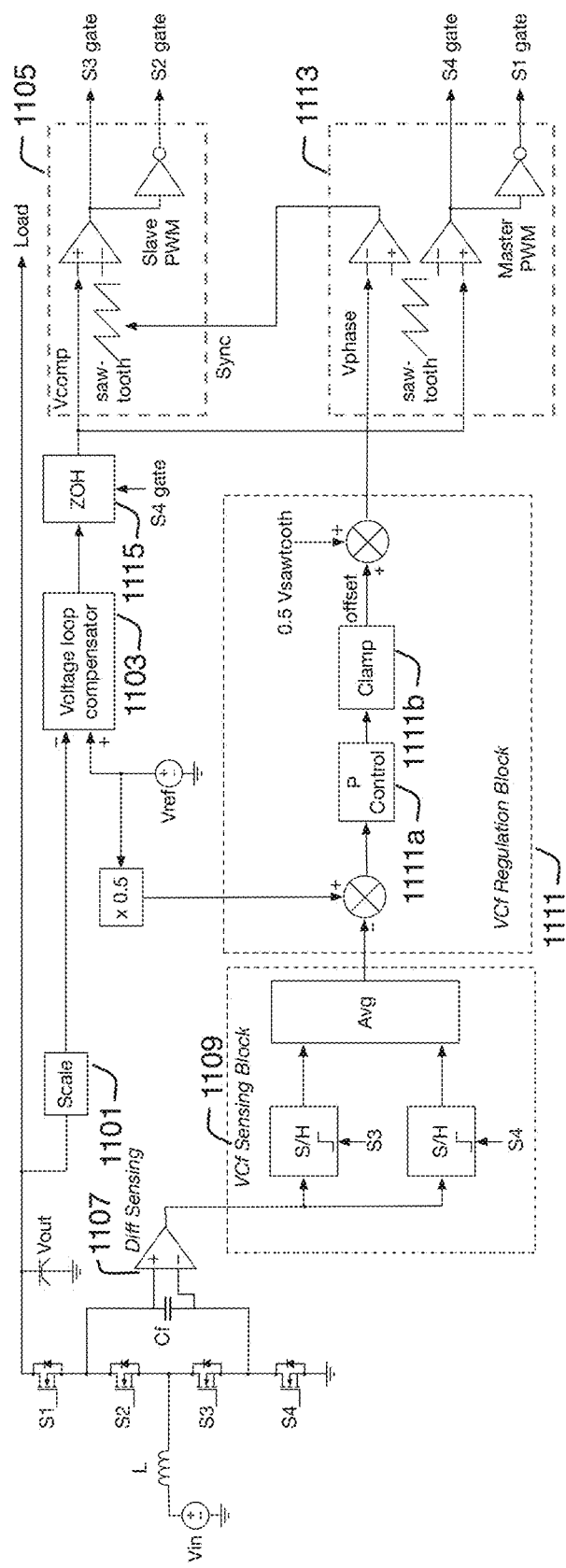
FIG. 11 illustrates a block diagram of a sliding charge window controller as described above.

An example embodiment of a flying capacitor boost converter with sliding charge window control is illustrated in FIG. 11. This embodiment fixes the S1/S4 PWM gate drive signals, and phase shifts the S2/S3 PWM gate drive signals relative thereto. As in the boost converter embodiments discussed above, a DC input voltage Vin is applied to a first terminal of an inductor L. The second terminal of inductor L is connected to the midpoint of a switching ladder made up of switching devices S1-S4. A flying capacitor Cf is connected between the junction of switches S1 and S2 and the junction of switches S3 and S4. Switches S1 and S4 are operated as a complementary switch pair, meaning that S1 is turned on when switch S4 is turned off and vice versa. Likewise, switches S2 and S3 are operated as a complementary switch pair, meaning that switch S2 is turned on when switch S3 is turned off and vice versa. It is to be understood that there may be a short dead time between switching events to prevent cross conduction. Switches S1 and S4 may be triggered by the gate drive signals S1 gate, S2 gate, S3 gate, and S4 gate generated by the controller as described in greater detail herein. The effect of this is to generate a regulated output voltage Vout that is delivered to a load.

The controller includes a first control loop shown in the upper portion of the control circuit and a second control loop shown in the lower portion of the control circuit. The control circuitry may be implemented in a variety of ways, including the use of analog control circuitry, digital control circuitry, hybrid analog/digital circuitry, programmed processors (such as microprocessors, microcontrollers, etc.), application specific integrated circuits (ASICs), and the like. The first control loop receives the output voltage Vout and applies it to a scaling circuit 1101. This scaled output voltage is applied to the first input of a voltage loop compensator 1103. Voltage loop compensator 1103 further receives a second input from the voltage reference Vref. Voltage loop compensator 1103 may be thought of as an error signal that generates an output signal (i.e., an error signal) corresponding to a difference between the desired output voltage (Vref) and the actual output voltage (Vout). This error signal is then applied to a zero-order hold circuit (discussed in greater detail below) and is provided as Vcomp input signal into PWM block 1105, which generates the gate drive signals for switches S2 and S3. In other words, the Vcomp signal effectively sets the duty cycle of the PWM gate drive signals that are applied to the switches. More specifically, PWM block 1105 generates the PWM signals by comparing to the Vcomp input signal to a sawtooth waveform, the phase of which is controlled by the second control loop discussed in greater detail below. This comparison generates the gate drive signals for switch S3, and the inverse of this comparison generates the gate drive signals for switch S2.

The second control loop, shown in the lower portion of FIG. 11, adjusts the phase of the S2/S3 gate drive signals by varying the phase of the sawtooth waveform applied to the inverting input of the PWM comparator of block 1105. More specifically, the second control loop receives as a control input the voltage across flying capacitor Cf, which may, for example, be sensed by differential sensing amplifier 1107. This flying capacitor voltage signal is delivered to VCf (flying capacitor voltage) sensing block 1109, which includes two sample and hold circuits, one triggered by S3 and the other triggered by S4. The sampled values are then provided to an average that generates an output signal corresponding to the average voltage appearing across flying capacitor Cf during the switching cycle. As discussed above, the flying capacitor voltage will slightly fluctuate/ripple due to the charging/discharging associated with the switching intervals. The effect of VCf sensing block 1109 is to smooth out this fluctuation/ripple to determine the average flying capacitor voltage, for which the target is one half the target output voltage.

Thus, the output of VCf (flying capacitor voltage) sensing block 1109 is input into VCf (flying capacitor voltage) regulation block 1111. VCf (flying capacitor voltage) regulation block 1111 receives as its other input the reference voltage Vref scaled by one-half. These two inputs are applied to a summer, which outputs an error signal that is a difference between the average flying capacitor voltage and one half the target output voltage. This error signal is input into phase control block 1111a and clamp 1111b, which generate an offset signal that is then summed with half the sawtooth voltage waveform to generate the Vphase signal. Control block 1111a may, as in the illustrated example, be a proportional controller, meaning that the output is proportional to the input signal. However, other types of compensators could also be used as appropriate for a given embodiment. In any case, the Vphase signal is compared with the sawtooth waveform of second PWM block 1113 to generate the Sync signal used to regulate the phase shift of the S2/S3 gate drive signals by varying the phase of the first PWM block 1105's sawtooth signal relative to the sawtooth signal of second PWM block 1113. PWM block 1113 also receives the Vcomp signal discussed above with reference to the first control loop as the input into a PWM comparator, which is compared to the sawtooth waveform. This comparison generates the gate drive signals for switch S1, and the inverse of this comparison generates the gate drive signals for switch S4.

When the flying capacitor voltage equals to its reference voltage (i.e., half the output voltage reference), the offset signal is 0, and the Vphase signal is a half of the PWM sawtooth signal amplitude, giving a 180° phase shift (half of a switching period). When the flying capacitor voltage deviates from its reference voltage, the offset signal will be non-zero, thus changing the Vphase signal to vary the phase of the S2/S3 switching transitions as described above. Additionally, a zero-order hold (ZOH) 1115 may be provided to hold the Vcomp signal (i.e., the PWM duty cycle) unchanged within each switching period. This keeps the input charge window and output charge window the same time length. If this hold is not implemented, the flying capacitor voltage may not be regulated to its reference voltage due to the changes in the respective charge/discharge windows. In the illustrated example, the ZOH is triggered by the S4 gate drive signal, which serves as the phase reference of the entire circuit. However, it will be appreciated that any other signal fixed to this reference, such as the S1 gate drive signal may be used instead. In alternative embodiments, the illustrated circuit may be reconfigured to fix S2/S3 and vary the S1/S4 phase, in which case either the S2 gate or S3 gate signals may be sued as the reference for ZOH circuit 1115. Likewise, for buck converter applications, the input voltage may be applied to the drain of switch S1, with the output being taken from the first inductor terminal (i.e., the inductor terminal not connected to the switch ladder). In such cases, the feedback voltage for the control loop may be taken from the output terminal, and the reference voltage may be changed accordingly.

The foregoing describes exemplary embodiments of an inductive flying capacitor power converter. Such systems may be used in a variety of applications but may be particularly advantageous when used in conjunction with battery powered personal electronic devices such as smartphones, smart watches, tablet computers, laptop computers, and associated accessories. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. An inductive flying capacitor power converter comprising:
    first, second, third, and fourth series-connected switches forming a switch ladder, wherein the first and fourth switches are operated as a first complementary switch pair and the second and third switches are operated as a second complementary switch pair;
    an inductor having a first inductor terminal coupled to a converter terminal and a second inductor terminal coupled to a junction between the second and third switches; and
    a flying capacitor having a first flying capacitor terminal coupled to a junction of the first and second switches, a second flying capacitor terminal coupled to a junction of the third and fourth switching devices, and a flying capacitor voltage between the first and second flying capacitor terminals;
    a control circuit that generates a first pair of complementary gate drive signals to drive one of the first or second complementary switch pairs and a second pair of complementary gate drive signals to drive the other of the first or second complementary switch pair, wherein the control circuit varies a phase shift between the first pair of complementary gate drive signals and the second pair of complementary gate drive signals to regulate the flying capacitor voltage, wherein varying the phase shift between the first pair of complementary gate drive signals and the second pair of complementary gate drive signals shifts the timing of a charging window of the flying capacitor so that,
        varying the phase shift in a first direction shifts timing of a charging window to cause an output charge from the flying capacitor to exceed an input charge to the flying capacitor, thereby decreasing the flying capacitor voltage; or
        varying the phase shift in a second direction shifts timing of a charging window in a second direction to cause an input charge to the flying capacitor to exceed an output charge from the flying capacitor, thereby increasing the flying capacitor voltage.

2. The inductive flying capacitor power converter of claim 1 wherein the power converter is a boost converter.

3. The inductive flying capacitor power converter of claim 2 wherein the first inductor terminal is coupled to an input terminal of the converter and an output terminal of the power converter is coupled to the first switch.

4. The inductive flying capacitor power converter of claim 1 wherein the power converter is a buck converter.

5. The inductive flying capacitor power converter of claim 4 wherein the first inductor terminal is coupled to an output terminal of the converter and an input terminal of the power converter is coupled to the first switch.

6. The inductive flying capacitor power converter of claim 1 wherein the control circuit further comprises a voltage control loop that regulates an output voltage of the converter and a flying capacitor voltage control loop that regulates the flying capacitor voltage.

7. The inductive flying capacitor power converter of claim 6 wherein the voltage control loop includes a zero order hold circuit that keeps a PWM duty cycle constant during a switching period of the converter.

8. The inductive flying capacitor power converter of claim 7 wherein the flying capacitor voltage control loop comprises a flying capacitor voltage sensing block that generates an output signal corresponding to an average of the flying capacitor voltage during a switching period.

9. The inductive flying capacitor power converter of claim 6 wherein the flying capacitor voltage control loop comprises a flying capacitor voltage sensing block that generates an output signal corresponding to an average of the flying capacitor voltage during a switching period.

10. An inductive flying capacitor boost converter comprising:
    first, second, third, and fourth series-connected switches forming a switch ladder;
    an inductor having a first inductor terminal coupled to a converter input terminal and a second inductor terminal coupled to a junction between the second and third switches, wherein an output terminal of the inductive flying capacitor boost converter is coupled to the first switch; and
    a flying capacitor having a first flying capacitor terminal coupled to a junction of the first and second switches, a second flying capacitor terminal coupled to a junction of the third and fourth switching devices, and a flying capacitor voltage between the first and second flying capacitor terminals;
    a control circuit that generates a first pair of complementary gate drive signals to drive the first and fourth switches and a second pair of complementary gate drive signals to drive the second and third switches, wherein the control circuit varies a phase shift between of the second pair of complementary gate drive signals relative to the first pair of complementary gate drive signals to regulate the flying capacitor voltage, wherein varying the phase shift between the first pair of complementary gate drive signals and the second pair of complementary gate drive signals shifts the timing of a charging window of the flying capacitor so that:

varying the phase shift in a first direction shifts timing of a charging window to cause an output charge from the flying capacitor to exceed an input charge to the flying capacitor, thereby decreasing the flying capacitor voltage; or varying the phase shift in a second direction shifts timing of a charging window in a second direction to cause an input charge to the flying capacitor to exceed an output charge from the flying capacitor, thereby increasing the flying capacitor voltage.

11. The inductive flying capacitor boost converter of claim 10 wherein the control circuit further comprises a voltage control loop that regulates an output voltage of the converter and a flying capacitor voltage control loop that regulates the flying capacitor voltage.

12. The inductive flying capacitor power converter of claim 11 wherein the voltage control loop includes a zero order hold circuit that keeps a PWM duty cycle constant during a switching period of the converter.

13. The inductive flying capacitor power converter of claim 11 wherein the flying capacitor voltage control loop comprises a flying capacitor voltage sensing block that generates an output signal corresponding to an average of the flying capacitor voltage during a switching period.

14. A control circuit for an inductive flying capacitor power converter, the inductive flying capacitor power converter comprising four switching devices, comprising a first switch device, a second switch device, a third switch device, and a fourth switch device, forming a switch ladder with the first and fourth switches being operated as a complementary switch pair and the second and third switches being operated as a complementary switch pair, an inductor coupled to a junction between second and third of the four switching devices, and a flying capacitor coupled between a junction of the first and second switching devices and a junction of the third and fourth switching devices, the control circuit comprising:

an output voltage control loop that regulates an output voltage of the converter; and a flying capacitor voltage control loop that regulates a flying capacitor voltage;

wherein the output voltage control loop and the flying capacitor voltage control loop cooperate to generate a first pair of complementary gate drive signals to drive one of the complementary switch pairs and a second pair of complementary gate drive signals to drive the other complementary switch pair so that varying a phase shift between the first pair of complementary gate drive signals and the second pair of complementary gate drive signals regulates the flying capacitor voltage, and wherein varying the phase shift between the first pair of complementary gate drive signals and the second pair of complementary gate drive signals shifts the timing of a charging window of the flying capacitor so that, varying the phase shift in a first direction shifts timing of a charging window to cause an output charge from the flying capacitor to exceed an input charge to the flying capacitor, thereby decreasing the flying capacitor voltage; or varying the phase shift in a second direction shifts timing of a charging window in a second direction to cause an input charge to the flying capacitor to exceed an output charge from the flying capacitor, thereby increasing the flying capacitor voltage.

15. The control circuit of claim 14 wherein the control circuit varies a phase shift between the first pair of complementary gate drive signals and the second pair of complementary gate drive signals to regulate the flying capacitor voltage.

16. The control circuit of claim 14 wherein the voltage control loop includes a zero order hold circuit that keeps a PWM duty cycle constant during a switching period of the converter.

17. The control circuit of claim 14 wherein the flying capacitor voltage control loop comprises a flying capacitor voltage sensing block that generates an output signal corresponding to an average of the flying capacitor voltage during a switching period.

* * * * *

UNITED STATES PATENT AND TRADEMARK OFFICE
CERTIFICATE OF CORRECTION

| | |
|---|---|
| PATENT NO. | : 11,689,094 B2 |
| APPLICATION NO. | : 17/324307 |
| DATED | : June 27, 2023 |
| INVENTOR(S) | : Zhiyuan Hu et al. |

It is certified that error appears in the above-identified patent and that said Letters Patent is hereby corrected as shown below:

In the Claims

Column 16, Claim 1, Line 4, delete the phrase "in a second direction".

Column 17, Claim 10, Line 6, delete the phrase "in a second direction".

Column 18, Claim 14, Line 21, delete the phrase "in a second direction".

Signed and Sealed this
Twenty-third Day of April, 2024

Katherine Kelly Vidal
*Director of the United States Patent and Trademark Office*